Inventor:
Pierre Jean Lhermite
By Baldwin, Wight, Diller & Brown
Attorneys

Inventor:
Pierre Jean Lhermite
By Baldwin, Wight, Diller & Brown
Attorneys

CIRCUIT ARRANGEMENT FOR EXPLOITING READING SIGNALS

Filed May 23, 1966 6 Sheets-Sheet 3

Inventor:
Pierre Jean Lhermite
BY Baldwin, Wight, Diller & Brown
Attorneys

Oct. 1, 1968 P. J. LHERMITE 3,404,379

CIRCUIT ARRANGEMENT FOR EXPLOITING READING SIGNALS

Filed May 23, 1966 6 Sheets-Sheet 4

Inventor:
Pierre Jean Lhermite
By Baldwin, Wight, Diller & Brown
Attorneys

CIRCUIT ARRANGEMENT FOR EXPLOITING READING SIGNALS

Filed May 23, 1966

Inventor:
Pierre Jean Lhermite
By Baldwin, Wight, Diller & Brown
Attorneys

Oct. 1, 1968 P. J. LHERMITE 3,404,379

CIRCUIT ARRANGEMENT FOR EXPLOITING READING SIGNALS

Filed May 23, 1966 6 Sheets-Sheet 6

Inventor:
Pierre Jean Lhermite
BY Baldwin, Wight, Diller & Brown
Attorneys 3,404,379

CIRCUIT ARRANGEMENT FOR EXPLOITING READING SIGNALS

Pierre Jean Lhermite, Paris, France, assignor to Societe Industrielle Bull-General Electric (Societe Anonyme), Paris, France Filed May 23, 1966, Ser. No. 552,075
Claims priority, application France, June 1, 1965, 19,096
12 Claims. (Cl. 340—172.5)

ABSTRACT OF THE DISCLOSURE

A system for exploiting read signals exhibiting transitions indicative of bit cell limits and middle-cell transitions. Generator means supply one pulse *r*1 and one pulse *r*2 respectively 0.75T and 1.25T after each "limit" transition, T being the nominal duration of a bit period, which may vary slightly. A first comparator cooperates with bistable stores to extract "1" and "0" information and to detect errors with regard to said pulses *r*1, *r*2 during a normal reading operation. Another comparator permits a more severe checking during a write check reading operation.

The present invention relates to systems for recovering information carried by a modulated signal and more particularly to an improved system which is capable of extracting an item of information from a self-synchronising signal and of supplying an indication of any errors which may emanate from a defective signal.

Such an improved system is suitable especially for the exploiting of a read signal derived from a recording on magnetic recording medium, such as a magnetic tape or a magnetic drum.

In the case of magnetic tape, complex problems arise when it is necessary to exploit the read signals emanating from a high-density recording. It is known that in this case the mean amplitude of the signal supplied by a reading head may undergo considerable variations as a result of minute changes in the distance between the magnetic head and the magnetised layer, which must normally be in contact. Now, a weakened read signal is the cause of errors in the interpretation of the reproduced information. Difficulties also arise in the synchronisation of the utilisation system.

It is known that the so-called "phase modulation" recording method renders possible an entirely satisfactory recording density while retaining possibilities of self-synchronisation. However, in regard to the application of the present invention, it is proposed to exploit data recorded by an also known method, which will be called "one-bit phase modulation," "bit" meaning "binary digit," which may also be described as "pulse-width modulation." The features of this method are the following. On the magnetic tape, each limit between two recording cells is materialised by a magnetisation inversion the direction of this magnetisation inversion being determined by the direction of the magnetisation of the preceding cell. When the binary digit 1 has been recorded in a cell, there exists a magnetisation inversion substantially at the centre of the extent of this cell. With regard to the binary 0, it may be stated that it is represented by the absence of a reversal of flux at the centre of the cell under consideration. A constant current flows in the winding of a writing head, in one or two opposite directions. To write a nought, this current does not change during a bit period, but it changes direction between two consecutive bit periods. To write a 1, the preceding write current is reversed at the centre of the bit period under consideration.

There have already been proposed systems which are capable of demodulating an input signal characterised by a transition at the centre of certain bit periods and by a transition marking the limit between two consecutive bit periods. These systems were not entirely satisfactory, either by reason of their complication or by reason of their inability to exploit high-density magnetic recordings and to supply an indication of error in the event of defective reading.

The invention proposes to supply relatively simple means for exploiting the recordings made on a magnetic tape by the aforesaid "one-bit phase modulation" method. This exploitation is effected in practice, starting with the read signal emanating from each reading head, by extraction of rhythm pulses necessary for the operation of the system, by demodulation or extraction of the recorded binary information, and by checking of the correction of the said read signal for the purpose of indicating any errors in interpretation. In addition, owing to a very simple control means, the exploiting system benefits by two separate modes of operation in regard to the detection of the errors. The first mode relates to the normal reading employed in the reproduction of the data recorded on each of the tracks of a magnetic tape. The second mode concerns a check reading which is carried out immediately after the recording or "writing" on a portion of tape. Of course, it is necessary to provide as many exploiting systems as there are recording tracks on this magnetic tape.

The detection of the errors in accordance with the invention assumes particular importance in the case where an apparatus for exploiting digital recordings is provided with a system for the automatic correction of errors. This system is in fact greatly simplified from the viewpoint both of the construction and of the operation when the exploiting systems make it possible to determine whether there are errors in a single track and in which track they have occurred.

However, the exploiting system according to the invention is not limited to processing a signal emanating from the reading of a magnetic tape. It is sufficient for the input signal to be characterised by the fact that it oscillates between two voltage levels and that it has transitions or edges including "limit" edges whose time spacing may vary about a period of mean duration T*m*, as also where necessary "digital" edges representing a binary digit, each of them normally being midway between two limit edges.

In accordance with the invention, therefore, the exploiting system comprises: a circuit arrangement adapted to generate from each of the said limit edges a first-rhythm pulse and a second-rhythm pulse 0.75 T*m* and 1.25 T*m* respectively after each limit edge; a first dual-state test register of which the inputs are controlled by two AND circuits arranged to change the state of the said register when the input signal is at a first level at the instant of a first-rhythm pulse; a second dual-state test register whose inputs are controlled by two AND circuits arranged to change the state of the said register when the input signal is at its second level at the instant of a second-rhythm pulse; a comparing device comprising logical circuits connected to compare the states of the outputs of the first and second test registers and having a "true" output and a "complement" output which are selectively actuated in accordance with whether the states of the two registers are identical or different; and an "information" register preceded by two AND circuits, whose separate inputs are connected to the outputs of the comparing device and one common input of which receives the second-rhythm pulses, the arrangement being such that the output of this register supplies at each bit period of duration T a signal of a predetermined value when the detected information is a 1, and a signal of a second, different value when the detected information is a 0.

For the purpose of detecting errors during a normal read operation, the exploitation system comprises in addition an "error" register preceded by an AND circuit, one input of which is connected to receive the first-rhythm pulses, while its other input is connected to an output of the said comparing device, in such manner that one output of this register remains at a predetermined voltage level only when one and only one "limit" edge clearly exists in the input signal during the time interval between a first-rhythm pulse and the succeeding second-rhythm pulse.

For the purpose of error detection during a writing-check reading operation, the exploitation system is characterised in addition by circuit means adapted to advance in time the emission of the first-rhythm and second-rhythm pulses; a third-rhythm pulse generator connected to generate from a pair of first-rhythm and second-rhythm pulses, a pair of pulses of duration of about 0.1 T*m*; a third test register preceded by two AND circuits connected to receive together the third-rhythm pulses and separately the input signal and the inverted input signal; and a second comparing device consisting of a bistable trigger circuit preceded by a number of logical circuits, some of the inputs of which are connected to the outputs of the first, second and third test registers and the other inputs of which are connected to receive the first-rhythm and second-rhythm pulses, so that an output of the trigger circuit supplies at each bit period of duration T a signal of a first value only when no edge exists in the input signals during the duration of each of the third-rhythm pulses.

For a better understanding of the invention and to show how it may be carried into effect, the same will now be described, by way of example, with reference to the accompanying drawings, in which:

FIGURE 1 is a basic diagram of a part of an exploitation system for producing various signals and rhythmic pulses in accordance with the invention;

FIGURES 2A and 2B, which should be assembled in accordance with FIGURE 2, show the electric circuit diagram of the devices constituting the said part;

Figures 1, 2:
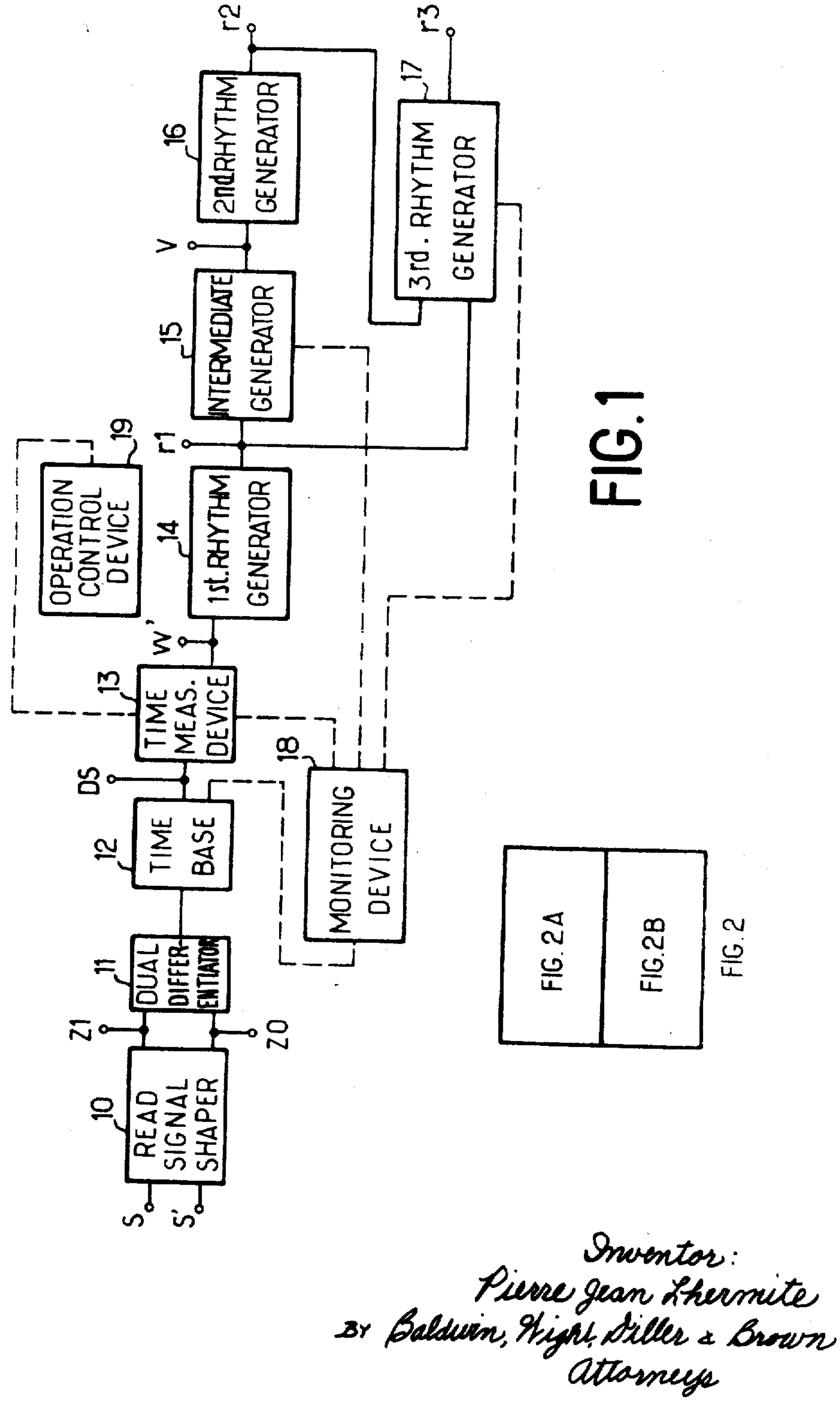

In the basic diagram of FIGURE 1, the various component elements are represented by rectangles. The convention in accordance with which the input terminal of an element is assumed to be to the left of the corresponding rectangle and consequently the output terminal is assumed to be to the right will be observed. The input and output terminals are simply denoted by the references of the signals and pulses which are received or available thereat, these references being those employed in FIGURES 4, 5 and 6.

Figure 4:
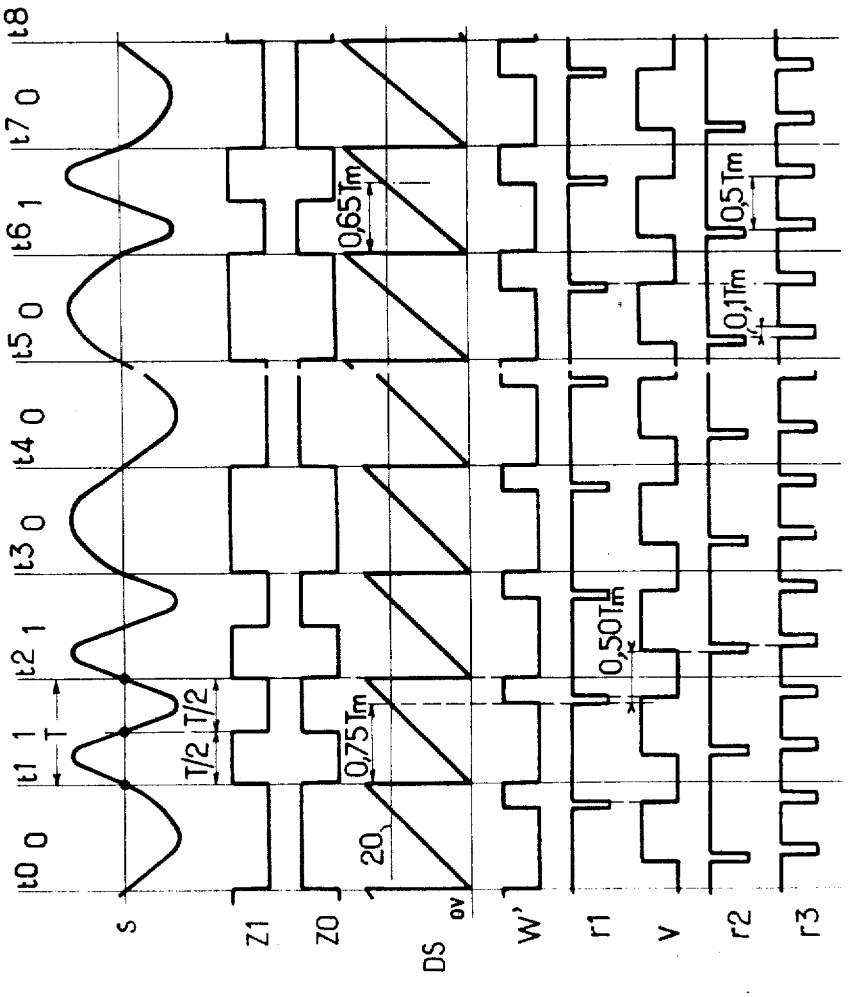
FIGURE 4 is a time graph of the wave forms which may be observed at different points of the elements of FIGURE 1, and FIGURES 5 and 6 are two graphs of the wave forms which may be observed at different points of the elements of FIGURES 1 and 3, in connection with the first and second modes of operation, respectively, of the exploitation system.

The device 10, designated a "read signal shaper," receives at its two inputs a so-called "normal" read signal *s* and a so-called "complementary" read signal *s'*. It will be assumed that each of these is an amplified and differentiated replica of the read signal emanating from a reading head adapted to co-operate with a track of a moving magnetic tape. The amplified read signal *s*, which is the only one shown in FIGURE 4, is composed of an approximately sinusoidal voltage wave. When a nought is recorded in a recording cell of the magnetic layer, a positive or negative half-cycle of this wave has a duration T equal to a "bit period." When a 1 is recorded in a recording cell, the read signal has two half-cycles, successively positive and negative, or vice versa, within one bit period. The read wave shape therefore comprises a passage through the zero voltage level at each bit period limit and in addition a passage through the zero voltage level at about the centre of a bit period when the scanned cell contains a recorded 1.

After amplification and level limitation, an output of the read signal shaper 10 supplies a first version of the input signal, or signal Z1, in which each passage of the read signal through the zero level results in an "edge" which is as abrupt as possible. The second version of the input signal, or signal Z0, is the inverse, or the complement, of Z1. It will be noted that in the described embodiment it is negative pulses, or voltage levels, which signify the logical "1." Therefore, in the graphs of FIGURES 4 to 6, the upper voltage level, substantially equal to 0 volt, represents the logical zero, the logical 1 corresponding to the lower voltage level, for example −6 volts. This is valid for all the signals with the exception of the signals *s* and DS. In addition, in practice, the changes from one voltage level to a different level, or pulse edges, are not instantaneous. It is only to facilitate the drawing that the vertical edges have been shown in the graphs.

The device 11, or dual differentiator, which is inserted between the shaper 10 and the time base device 12, enables the latter to generate the sawtooth wave DS, in which there can be seen a ramp increasing in the course of each bit period, bounded by a negative limit edge in the signals Z1 or Z0. Means have been applied to ensure that the "digital" edges, i.e. those occurring in Z1 and Z0 at about the middle of a bit period, have no influence on the operation of the time base 12.

The time measuring device 13 must generate from the sawtooth wave DS a positive pulse *w'* whose positive leading edge must occur in the course of each bit period, at the instant when the sawtooth voltgae becomes equal to a reference voltage level (20 in FIGURE 4) which is assumed to be absolutely fixed for the instant. It is arranged that the said leading edge of any pulse *w'* shall occur after a time interval equal to three quarters of one mean bit period, i.e. 0.75 T*m* after a limit edge in one or the other of the signals Z1 and Z0. The width of a pulse *w'* may therefore vary if the real or apparent duration of a bit period is not equal to the mean duration of the bit periods.

The device 14 or "first-rhythm generator," is connected to the output of the device 13 to generate a short negative pulse ***r*1** in coincidence with the positive edge of each pulse *w'*. This pulse generator will not be described in detail because many known types may be suitable. It is sufficient to specify that in one embodiment each pulse ***r*1** has a mean duration of 0.25 microsecond, leading and trailing edges of a duration of about 30 nanoseconds, and the already indicated amplitude of −6 volts. The power supplied by this generator must obviously be adapted to the number of devices utilising these pulses.

An intermediate generator 15 has the function of generating the series of negative pulses *v* from the first-rhythm pulses ***r*1**. The leading or negative-going edge of each pulse *v* must coincide with the trailing or positive-going edge of a pulse ***r*1**. It will later be seen that this generator is a monostable trigger circuit adapted to supply at its output a pulse of theoretically fixed duration, namely 0.5 T*m* less 0.25 microsecond.

The device 16 or "second-rhythm generator," is connected to the output of the device 15 to generate a brief negative pulse ***r*2** in coincidence with the trailing edge of each pulse *v*. Each pulse ***r*2 has the same characteristics as a pulse *r*1. The leading edges of a pulse *r*1 and of the succeeding pulse *r*2** are therefore spaced apart by 0.5 T*m*.

The device 17, or "third-rhythm generator," has its inputs connected to the output of the generators 14 and 16. It is also a monostable trigger circuit, which supplies at its output a pulse ***r*3** of fixed duration, i.e. about 0.1 T*m*, from each of the pulses ***r*1 or *r*2** received at one of its inputs. The leading edge of each pulse $r3$ coincides with the trailing edge of a pulse $r1$ or $r2$.

A monitoring device 18 is provided, which is controlled from the time base device 12. It is this monitoring device which supplies to the time measuring device 13 the discriminating voltage level 20 (FIGURE 4). Its purpose is to compensate for the differences of the speeds of travel of the magnetic tape. These differences may be constant if, for example, the tape transport mechanism employed for reading has not the same speed as that employed in writing. These differences may also be transient if the speed of travel of the tape departs momentarily from the theoretical rated speed. In any case, the monitoring device 18, which comprises an integrating circuit, responds to a sudden disturbance only with a delay of several bit periods. Therefore, it is not adapted to compensate for the sudden speed variations, either true or apparent, which result from defects in reading, as will hereinafter be explained.

It will be observed that, owing to the monitoring device 18, the leading edge of each pulse $w'$ always occurs 0.75 T$m$ after a limit edge of the input signal even if the succeeding limit edge bounds a bit period of abnormal duration. The monitoring device 18 performs a control action on the generators 15 and 17 for the purpose of maintaining the proportionality of the duration of the pulses $v$ and $r3$ to the mean duration of the preceding bit periods.

It is to be noted that in FIGURE 4 the period limited by the instants $t0$ to $t5$ is relative to the first mode of operation involving reading of normal reproduction of a magnetic tape and that the period limited by the instants $t5$ to $t8$ is relative to the second mode of operation involving the writing-check reading, which is the only operation in which the pulses $r3$ are really utilised.

In FIGURE 1, there is provided an "operation control" device 19, which performs an action on the operation of the time measuring device 13. This action is such during the first mode of operation that, as already stated, the leading edge of a pulse $w'$ occurs 0.75 after the preceding limit edge of the input signal. During the second mode of operation, the action of the device 19 on the device 13 has the same effect as an increase of the maximum amplitude of the sawteeth applied to the input, without the voltage level 20 being modified (FIGURE 4, period $t5$–$t8$). Consequently, the leading edge of each pulse $w'$ is now advanced in such manner that it occurs 0.65 T$m$ after the preceding limit edge. The result of this is that the pulses $r1$, $v$ and $r2$ are also advanced, in order that, of the pulses of a pulse pair $r3$ constituting sampling "windows," the first may commence 0.7 T$m$ after the preceding limit edge and the second 0.5 T$m$ after the first.

Figure 2A:
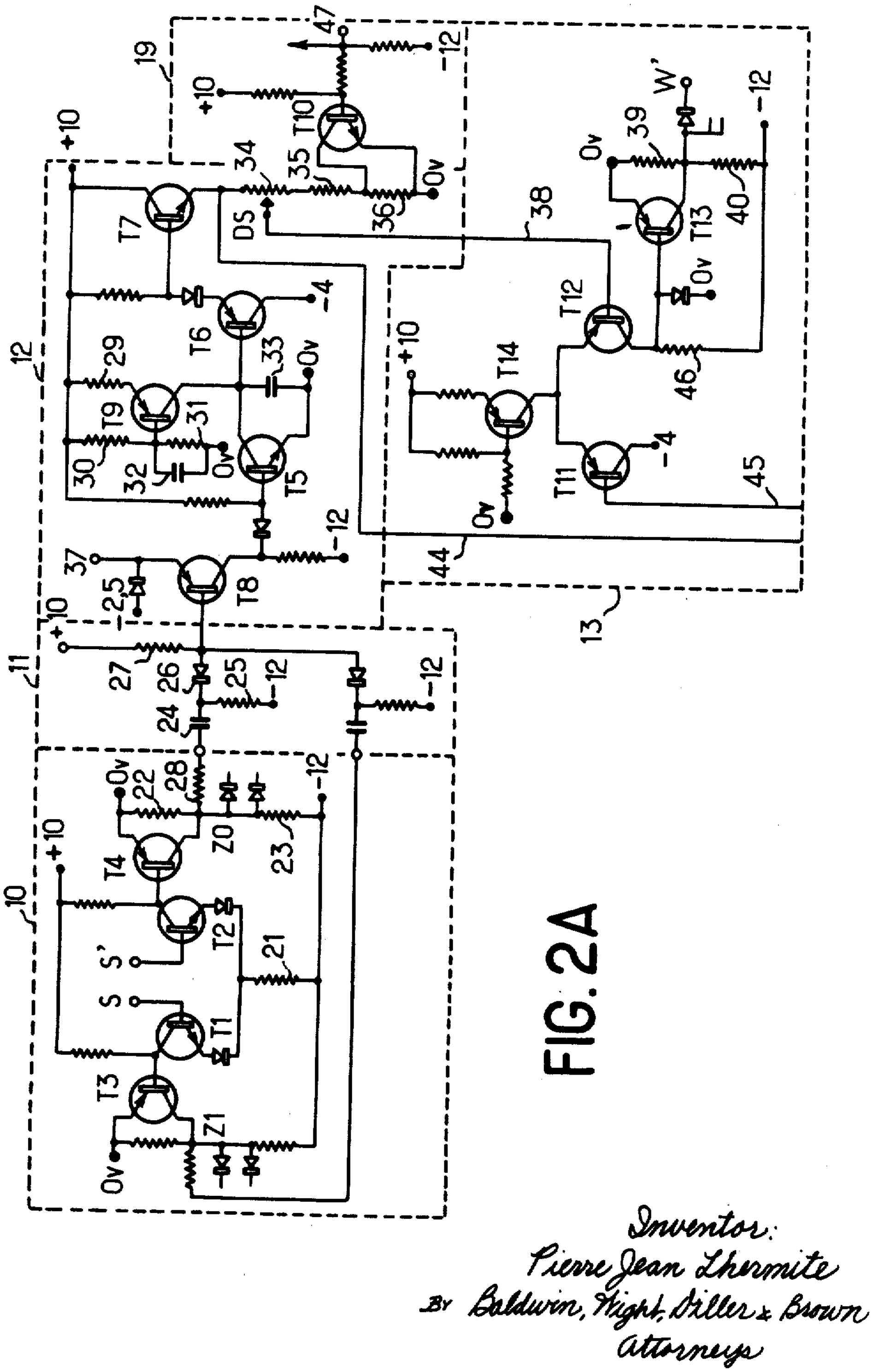
Figure 2B:
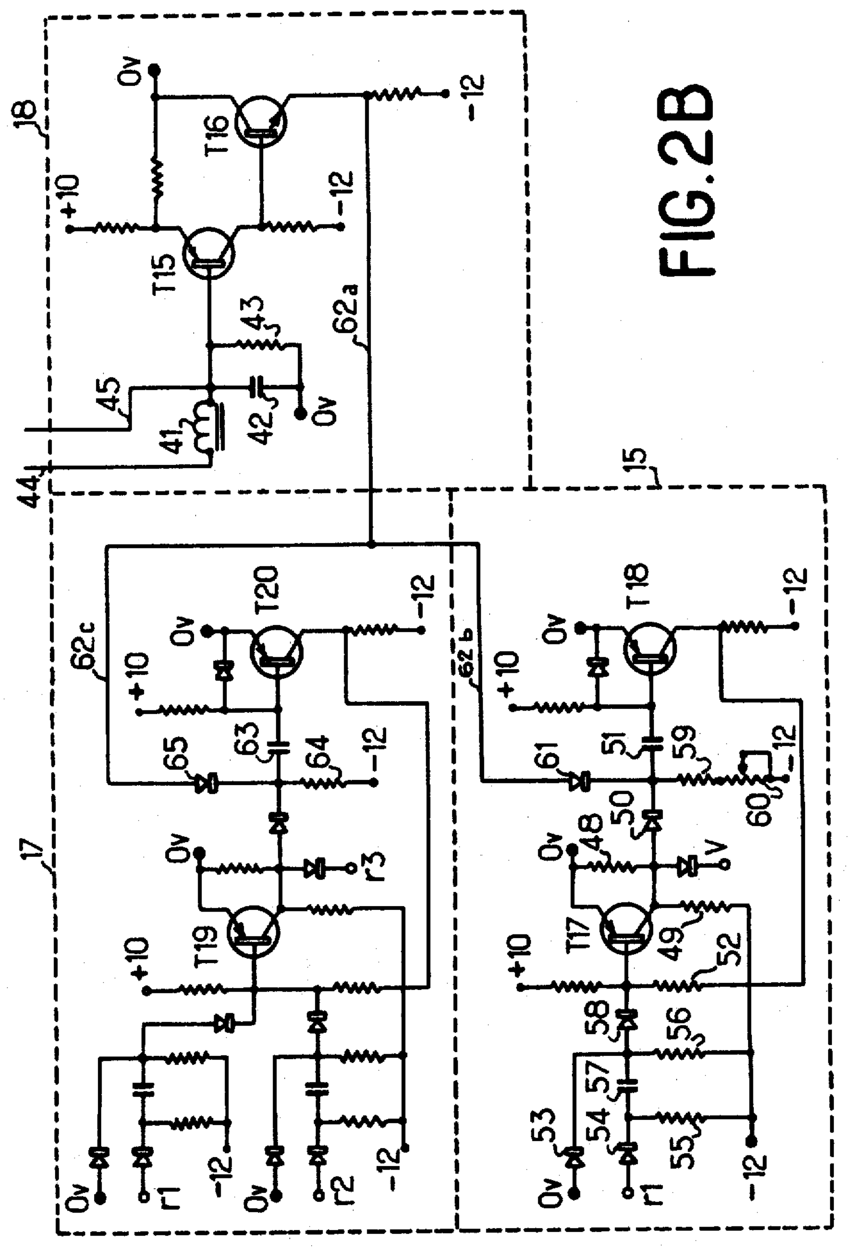

Referring to FIGURES 2A and 2B, the circuit arrangement provided for shaping the input signal and producing the various rhythm pulses will be examined. Since the circuit diagrams are sufficiently explanatory in themselves and the voltages supplied by the usual voltage sources have been indicated, only limited explanations will be given, but these will be sufficient to enable the operation of these circuits to be understood.

The assembly 10 constitutes the input signal shaping device. It is composed essentially of two NPN transistors T1, T2 and of two PNP transistors T3, T4. By virtue of the members associated therewith, they form a symmetrical emitter feedback amplifier. The input terminals are directly connected to the bases of the transistors T1 and T2 respectively. These terminals separately receive the read signals $s$ and $s'$. These read signals, of which only the read signal $s$ is shown on the line $s$ of the graph of FIGURE 4, are available at the output of a pre-amplifier device, which is not shown because it does not form part of the invention and may take any known conventional form. However, it is sufficient to state that such a device, which receives the output signal supplied by a magnetic reading head, comprises first a differentiating circuit before the amplifier proper. It will be assumed that the latter is terminated by an output transformer whose centre-tapped secondary winding (or separate secondary windings) supplies the signal $s$ at a first output terminal, and the signal $s'$, which is merely the signal $s$ inverted, at a second output terminal.

It is also to be noted that this amplifier may preferably have an amplitude/frequency response curve such that if the gain is G at the frequency F, $G/2$ at the frequency $F/2$ and 2G at the frequency 2F, the gain thereafter falls by 12 decibels per octave in the case of frequencies above 2F. However, such characteristics are not at all essential.

When the signals $s$ and $s'$ are applied to the bases of the transistors T1 and T2, the voltage across the terminals of the common resistor 21 scarcely varies. Of the output terminals Z1, Z0, the output Z0, for example, consists of the junction point of the collector of T4 and of the resistors 22, 23. The latter are of like value, for example 2.2 kilohms. When the signals $s$ and $s'$ are received, and outside the transition periods during which the collector currents of T3 and T4 are in the course of varying, one of the latter is always saturated and the other non-conductive. For example, during the period $t0$–$t1$, T4 is conductive and T3 is non-conductive, so that the voltage at the output Z0 is substantially equal to 0 volt, and the voltage at the output Z1 is limited to −6 volts.

The assembly 11 comprises two differentiating circuits, each of which is composed of a capacitor 24, a resistor 25 and a diode 26. A common resistor 27 is provided. One plate of the capacitor 24 is connected to the output Z0 by a resistor 28. Each time a voltage change of negative direction occurs at one or other of the terminals Z1, Z0, a brief negative pulse can be transmitted by one of the diodes 26.

The assembly 12, or time base, comprises essentially the transistors T5, T6 and T7. In addition, there is provided an input control stage including the transistor T8. The transistor T9, which is associated with the resistors 29, 30 and 31 and with the capacitor 32, simulates a constant current source. An energy storage device consists of the capacitor 33. It is the successive charge and discharge phases of the latter that result in a sawtooth wave similar to that which can be seen on the line DS of FIGURE 4 and which appears at the emitter of T7. The emitter load impedance of the latter is formed of the voltage divider including the resistors 34, 35 and 36.

During normal operation, the transistors T8 and T5 are generally non-conductive, and the transistor T9 supplies to the capacitor 33 a constant charge current, so that the voltage applied to the base of T6 increases linearly. Since the transistors T6 and T7 are connected as emitter-follower, the same is the case with the sawtooth voltage available at the emitter of T7.

The terminal 37 serves to control the operation of the transistor T8. Let it first be assumed that the voltage applied to the terminal 37 is earth voltage, or 0 volt. When a negative pulse of brief duration is received by the base of T8, the latter becomes conductive, which results in saturation conduction of the transistor T5. The latter takes up a heavy collector current, which consists mainly of the discharge current of the capacitor 33. Thus, the capacitor 33 is rapidly discharged, and this results in T7 becoming non-conductive, so that the sawtooth voltage rapidly falls.

In practice, the terminal 37 is subjected to a square-wave voltage such as that illustrated on the line $w'$ of FIGURE 4, but applied with a slight delay when control circuits (not shown) have detected the beginning of an information block. Owing to this, T8 can react to a negative input pulse only when this voltage is high. This control is intended to prevent a negative pulse, resulting from a negative edge at the terminals Z1 or Z0, towards the centre of a bit period, from having the effect of prematurely stopping the growth of the sawtooth in progress.

The assembly 13, or time measuring device comprises essentially transistors T11, T12 and T13. The transistor T14 associated with three resistors constitutes a constant current source similar to that simulated by the transistor T9. The base of the transistor T12 is connected by the conductor 38 to the adjustable tap of the resistor 34, which is in fact a potentiometer. The base of T12 therefore receives the sawtooth wave form DS. The collector impedance of the transistor T13 is formed of two resistors 39, 40 of equal value, for example 2.7 kilohms.

The monitoring device 18 (FIGURE 2B) comprises the transistors T15 and T16 and an integrating circuit consisting of the inductor 41 and the capacitor 42. The base current of T15 can flow through the resistor 43. The left-hand end of the inductor 41 receives through the conductor 44 the sawtooth voltage available at the emitter T7 (FIGURE 2A). The object of the integrating circuit is to supply at the base of T15 a mean unidirectional voltage which is a function of the mean speed of travel of the magnetic tape. The repercussions which the changes of this mean voltage may have on the voltage available at the emitter of T16 will be considered later. This same mean voltage, which constitutes a discrimination threshold, is applied through the conductor 45 to the base of the transistor T11 of the time measuring device 13. Although a slight residual ripple remains, it may be assumed that the base of T11 is subjected to a unidirectional voltage, which has a predetermined fixed value when the speed of travel of the tape is exactly equal to the rated speed of the tape during the writing operation. Assuming that the mean voltage in question is +3.85 volts, for example, it will be seen that the transistor T11 is non-conductive from the beginning of each bit period, while the transistor T12 is conductive, because the voltage of the emitter of T12, and therefore that of the emitter of T11, commences by substantially following the sawtooth voltage DS. Since T12 is conductive, the transistor T13 is non-conductive and the voltage $w'$ available at the collector of T13 is −6 volts. As the voltage at the base of T12 continues to increase, a time arrives when this voltage becomes equal to the voltage of the base of T11, and even exceeds that of the emitters of T11 and T12. Then, T12 is suddenly rendered non-conductive and a constant collector current passes through T11. When T12 is non-conductive, the transistor T13 rapidly becomes saturated, since its base current can now flow through the resistor 46. Therefore, the voltage $w'$ becomes substantially equal to 0 volt. When the sawtoothed voltage suddenly falls again, T12 again becomes conductive and T11 and T13 are rendered non-conductive again.

The operation control device 19 (FIGURE 2A) comprises essentially the transistor T10, the collector and emitter of which are connected in parallel with the resistor 36. During a normal reading operation, it is desirable that the positive edge of a pulse $w'$ should occur 0.75 T$m$ after the beginning of every bit period. A zero or slightly positive voltage is then continuously applied to the terminal 47 by means not shown. This voltage is sufficient to produce saturation of the transistor T10. The resistor 36 of 390 ohms is therefore substantially short-circuited. The emitter load resistance of T7 then consists only of the potentiometer 34 and the resistor 35, each of 500 ohms. The tap on the potentiometer is so adjusted that the current commutation between the transistors T11 and T12 occurs 0.75 T$m$ after the beginning of each bit period.

It may be seen that the voltage comparison actually effected by the device 13 is not exactly that which has previously been indicated. Since it is easier to have available a mean reference voltage equal substantially to one half of the maximum amplitude of the sawtooth voltages (emitter of T7), the adjustable tap of 34 is so adjusted as to apply only two-thirds of the said saw-tooth voltage to the base of T12.

In the check reading operation which immediately follows the writing, a negative voltage is applied to the terminal 47, so that the transistor T10 is rendered non-conductive. The resistor 36 is then in circuit, and a larger fraction of the sawtooth voltage is applied to the base of T12. Consequently, the said current commutation occurs earlier, i.e. 0.65 T$m$ after the beginning of each bit period.

The generator 15 (FIGURE 2B), which has the function of generating the wave form $v$, is composed of a monostable trigger circuit including essentially the transistors T17 and T18. Two resistors 48, 49 of 2.7 kilohms form the collector load impedance of T17. A first connection, including the diode 50 and the capacitor 51, connects the collector of T17 to the base of T18. A feedback connection, including the resistor 52, connects the collector of T18 to the base of T17.

An input device is provided which can perform in other applications the function of an AND circuit for pulse edges. This device is composed of two diodes 53, 54, two resistors 55, 56 and a capacitor 57, and its output is connected by the diode 58 to the base of T17. The first-rhythm pulses $r1$ are applied to the diode 54. It will be recalled that each pulse $r1$ has an amplitude of −6 volts and a duration of 0.25 microsecond. By reason of the orientation of the diodes 53, 54 and 58, the capacitor 57 becomes charged in the course of each of the pulses $r1$.

When the trigger is in the stable state, T17 is conductive and T18 is blocked. In coincidence with the positive-going leading edge of a pulse $r1$, a brief positive pulse reaches the base of T17, which is rapidly rendered non-conductive. Since that part of the collector current of T17 which was flowing through 50, 59 and 60 is suppressed, the capacitor 51 tends to become charged and for this purpose it takes up base current of T18, which renders the latter conductive. By reason of the link through 52, T18 maintains T17 in the non-conductive state. The capacitor 51 forms with the resistor 59 and 60 a circuit having a time constant. The value of the resistor 60 is so adjusted that the unstable state of the trigger has a duration normally equal to 0.5 T$m$ less the duration of one pulse $r1$. This is constantly true, because the duration of a negative pulse $v$ is dependent upon the speed of the tape by reason of the fact that the junction point of the capacitor 51 and of the resistor 59 is connected through the diode 61 and the conductors 62$a$, 62$b$ to the emitter of the transistor T16 of the monitoring device 18.

When the speed of the tape is below the rated speed, the duration of each bit period is increased. The maximum amplitude reached by each ramp of the sawtooth also increases, as also does the mean voltage applied to the base of T15. Now, owing to the interconnections of the transistors T15 and T16, the voltage at the emitter of T16 changes in the opposite direction to the voltage applied to the base of T15. In the present case, the voltage of the emitter of T16 becomes more negative. Since this voltage, which is transmitted through the diode 61, fixes the maximum negative voltage to which the capacitor 51 can be charged, upon which there depends the instant at which T18 is rendered non-conductive again, the duration of the pulse $v$ is increased in proportion with the duration of the new period T. The inverse effects occur when the speed of the tape is above the rated speed. It is to be noted that by reason of the time constant chosen for the integrating circuit 41, 42, 43, the variations of the speed of the tape affect the operation of the monitoring device 18 only with a delay of 7 to 10 bit periods.

The third-rhythm generator 17 is composed of a monostable trigger circuit and of two input circuits, each of them being identical to that included in the generator 15. The design of this monostable circuit, including the transistors T19 and T20, is similar to that of the preceding one. However, the time-constant circuit comprising the capacitor 63 and a fixed resistor 64 is so designed that each pulse $r3$ has a normal duration of 0.1 T$m$, such a pulse being generated each time a pulse $r1$ or $r2$ is received at one or the other of the two input circuits. The duration of each pulse $r3$ is also regulated by the monitoring device 18 by reason of the existence of the connection of the junction point of 63 and of 64, through the diode 65 and the conductors 62$c$, 62$a$, to the emitter of T16.

Figure 3:
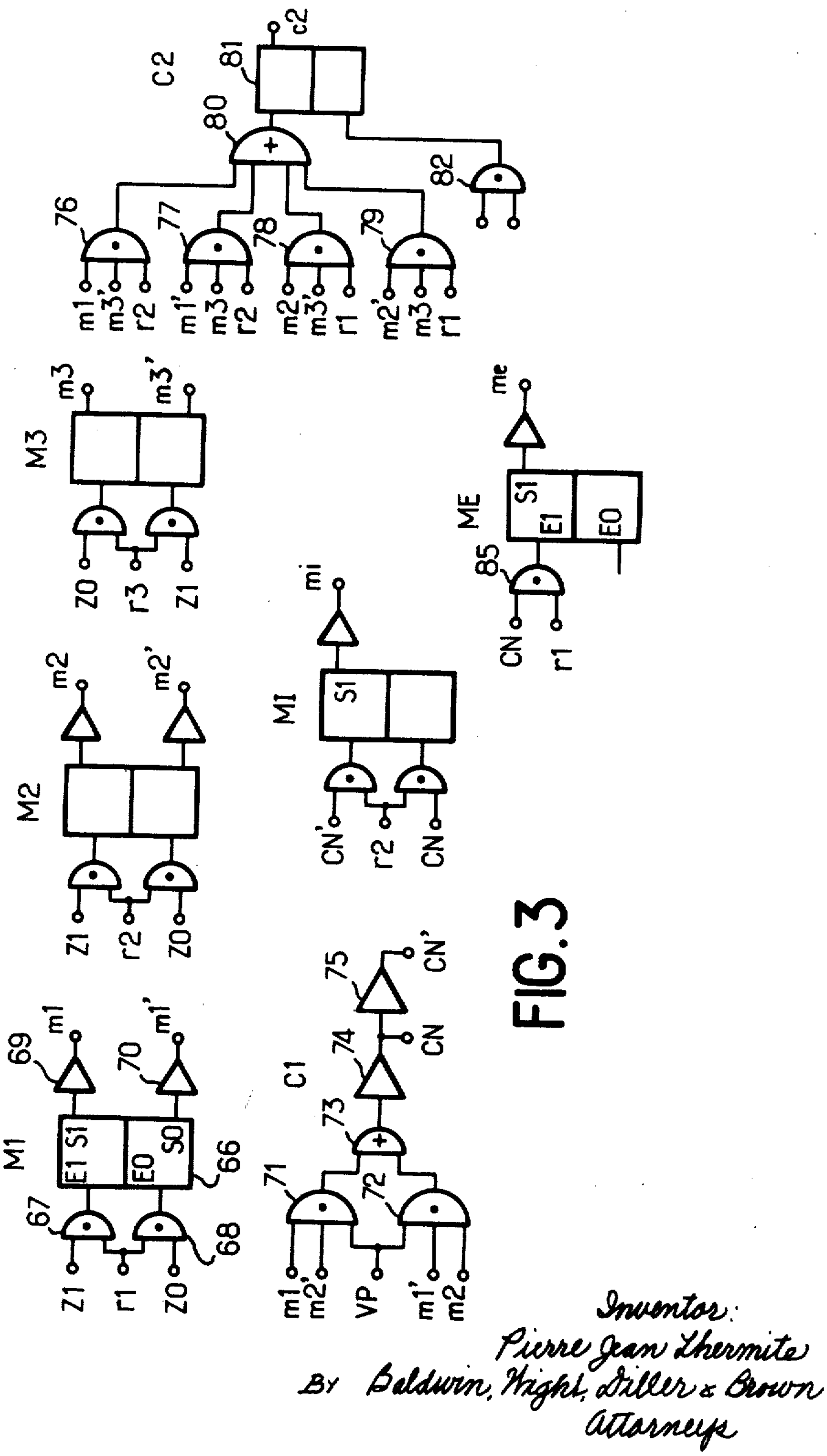
FIGURE 3 illustrates the logical elements forming the second part of the exploitation system and allocated to the extraction of information and to the detection of errors.

The circuit arrangement for the extraction of the information and the detection of the errors is illustrated in the form of separate elements in FIGURE 3. If all the connections between the outputs and the inputs of the various elements had been illustrated, the diagram would have been overcrowded and difficult to read. It has been preferred to indicate opposite each output the reference of the available signal and opposite each input the reference of the signal received, so that it is easy to deduce therefrom the interconnections actually made.

The said elements comprise: a number of so-called "test" registers M1, M2 and M3, an "information" register MI, an "error" register ME, a first comparator C1 and a second comparator C2.

Each of the registers comprises essentially a binary or dual-state device. For example, the first test register M1 is composed of the bistable trigger circuit 66, a first AND circuit 67, a second AND circuit 68, a first output amplifier 69 and a second output amplifier 70. The AND circuits comprising diodes and resistors for negative pulses are well known. The bistable trigger may be a circuit having two NPN transistors. An inverting amplifier may comprise a PNP transistor. Detailed diagrams of these circuits therefore do not appear to be necessary. However, it will be noted that when the trigger 66 is in the state "0," the voltage levels available at the outputs $m$1 and $m$1' are 0 volt and −6 volts respectively. When two pulses, or negative voltage levels, have been applied to the inputs of the AND circuit 67, the trigger 66 has changed to the state "1," which is manifested by the fact that the above-indicated voltage levels are interchanged at the outputs $m$1 and $m$1'.

The structure of the register M2 is identical to that of the register M1.

The register M3 is similar to the registers M1 and M2, except that an output amplifier is not used. The register MI is similar to the registers M1 and M2, except that only the upper output S1 is used. The register ME is similar to the register MI except that only the input E1 receives the output of an AND circuit and that a return-to-zero control is necessary at the input E0.

The first comparator C1 comprises two AND circuits 71 and 72, the outputs of which are connected to the inputs of an OR circuit 73. The latter is followed by two inverting amplifiers 74 and 75. The indication VP (validation of the track) corresponds to an authorisation signal supplied by control members of the tape apparatus as soon as the preparatory zone preceding a block of information has been scanned.

The second comparator C2 comprises four AND circuits 76 to 79, the outputs of which are connected to the inputs of an OR circuit 80, and a bistable trigger 81 circuit. An AND circuit 82 may serve to control the return-to-zero of the trigger 81 circuit.

Figures 5, 6:
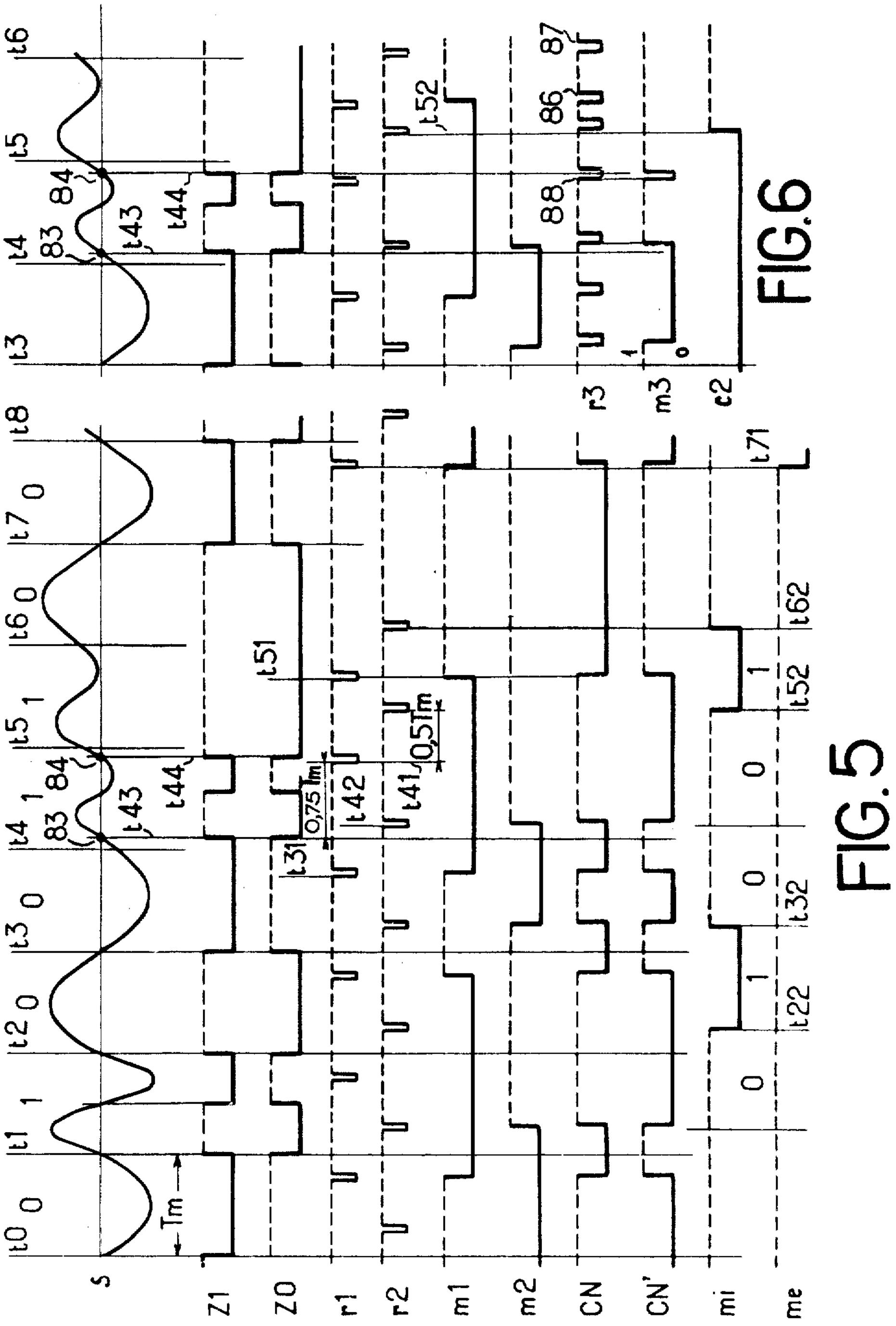

The first mode of operation of the exploitation system will be considered with reference to the graphs of FIGURE 5, during normal reading. It is to be noted that the faults occurring in writing and the faults occurring in reading have the same effects on the deformation of the read signal. It would seem that in the event of a fault the half-cycle at the frequency F (with $F=1/Tm$) are more disturbed than the half-cycles at the frequency $F/2$. A fault, generally emanating from a temporary increase of the distance from the head to the magnetic layer, always results in a weakening of the read signal, generally accompanied by a shift of the mean level. This results in variations of the instants of the passages through the zero voltage level. While amplitude variations are properly eliminated by the limiting or clipping characteristic of the shaper 10, shifts in relation to time in the edges of the normal and complementary versions Z1 and Z0 of the input signal still remain. If these forward or backward shifts are too great, they may have a harmful influence on the rhythm signals and on the interpretation of the data read.

The "information" register MI co-operates with the first comparator C1 and with the test registers M1 and M2 for extracting the information read on a track, in order that it may be stored in a buffer register. The register M1 must memorise the state of the first form (Z1) of the input signal at the instant when it receives a first-rhythm pulse $r$1. It will be seen from line $m$1 that the output of the amplifier 69 of the register M1 can change to the logical 1 at the pulse $r$1 succeeding the instant $t$0, because Z1 is negative during this bit period. The state of this register will be modified only at the pulse $r$1 in the period $t$2–$t$3, in the course of which it is Z0 which is negative. The register M2 must memorise the state of the second version (Z0) of the input signal at the instant when it receives a pulse $r$2. The line $m$2 gives its changes of state. It will be apparent that the signal $m$2 is normally the inverse of the signal $m$1, with in addition a shift of a bit half-period. It is to be noted in addition that a change-over of M1 normally occurs in the course of a bit period only when the corresponding cell contains a nought.

The comparator C1 effects the comparison of the states of the test registers M1 and M2 and constantly supplies the indications of the results of this comparison (see the signals CN and CN' in FIGURE 5). CN has a negative voltage level only when the states of the registers M1 and M2 are identical. On the other hand, CN' has a negative voltage level only when the states of M1 and M2 are different and therefore opposed.

A sampling of the states of the outputs of the comparator C1 at the instants of the second-rhythm pulses r2 determines the state of the "information" register MI. The output of the latter must be at the level 0 volt, or logical zero, when the information read in the preceding bit period was a zero, and at the level of the logical 1 if this information was a 1, because it will be seen that this output remains at the logical zero until the instant $t$22, when it changes to the logical 1, because at this instant CN' is negative. The output $mi$ remains at the logical 1 until the instant $t$32, when it is the signal CN which is negative. Thus, it will be seen that this output displays the digit 1 which was present in the read signal during the bit period $t$1–$t$2.

In addition, the register ME is connected by one input of its AND circuit 85 to the output CN of the comparator C1. In the absence of a fault or error, the output $me$ must remain constantly at the level of the logical zero.

It will be considered what happens in the case of a defective read signal such as that illustrated at $s$ between the instants $t$3 and $t$7. Some crossings of the zero level occur with backward or forward time shifts, such as those marked 83, 84. It may even happen that the read signal is weakened or distorted in such manner that two crossings of the zero level disappear, as is the case in the interval $t$5–$t$6.

It will be seen that the crossings 83, 84 bound a bit period which is shorter than a mean bit period, of duration T$m$. In the signals Z1 and Z0, the limit edges are now located at the instants $t$43 and $t$44. However, the operation of the devices is still not seriously disturbed, because, as must normally happen, the edges of the signals Z1 and Z0 of the instant $t$43 are situated in the "window" consisting of the preceding pulse $r$1 (instant $t$31) and the succeeding pulse $r$2 (instant $t$42). Likewise, the pulse $r$1 produced 0.75 T$m$ after the instant $t$43 precedes the edges of Z1 and Z0 at the instant $t$44. Therefore, there is nothing incorrect in the states of the registers M1, M2 and of the comparator C1. It will in fact be seen that the output of the register MI clearly displays in the interval $t$52–$t$62 the digit 1 read during the period $t$4–$t$5.

However, the fact that there is no edge, and above all no limit edge in the signals Z1, Z0 in the interval $t44$–$t7$, constitutes a cause of error which must be signalled. Since the time-measuring device 13 and the generators 14 to 16 continue to operate, a pulse $r1$ is generated 0.75 T$m$ after the instant $t44$, i.e. at $t51$. Since Z0 is negative at this instant, the register M1 is returned to "0", while it would normally have to remain in the state "1". With a little delay due to the transmission times, the outputs CN and CN' of the comparator indicate that the states of the test registers M1 and M2 are identical. This is why, when a pulse $r2$ is produced 0.5 T$m$ after the instant $t51$, the latter has the effect of returning the register MI to the state "0", since only the output CN is negative at this instant. Thus, the output $mi$ displays a zero by error from the instant $t62$.

This error is signalled a little later by the "error" register ME. If its state from the beginning is considered, it may be seen that the output $me$ has remained at the upper voltage level, because at each pulse $r1$ the voltage at the output CN was high from $t0$ to $t51$. The output CN thereafter becomes negative and is still negative in the course of the period $t7$–$t8$, and notably at the instant $t71$ when a fresh pulse $r1$ reaches an input of the AND circuit 85 at the input of ME. The latter therefore passes to the state "1", and the negative voltage then appearing at the output $me$ constitutes an error signal which may be utilised in the usual way. More particularly, control circuits of the apparatus may then be notified so that they interrupt the previously mentioned authorisation signal VP, which is applied to inputs of the AND circuits 71 and 72 of the comparator C1.

It may be observed (FIGURE 5) that if the zero crossing 84 had been even further advanced, for example so that the edges of Z1 and Z0 were produced before the instant $t41$ of the production of a pulse $r1$, an error would have been detected in the same way, but earlier. Other faults may be established by the presence of two edges, namely a digital edge and a limit edge, during the interval bounded by a pulse $r1$ and a pulse $r2$. This anomaly would obviously be signalled as an error.

The devices operating during the first mode of operation obey the following rules. Since each limit edge of the input signal conditions the emission of a first-rhythm pulse and of a second-rhythm pulse, any limit edge must be located between the two pulses of the first and second rhythms emanating from the preceding limit edge (or last limit edge). Any digital edge of the input signal must be located substantially midway between the preceding limit edge and the succeeding limit edge. Therefore, if a digital edge is shifted backwards, it is nevertheless necessary for it to be located before the first-rhythm pulse emanating from the last limit edge, and if a digital edge is shifted forwards, it must nevertheless be located after the second-rhythm pulse emanating from the limit edge before the last one. If the input signals are acceptable, that is to say, if all the edges are correctly located, then the changes of state of the registers M1 and M2 must succeed one another as a result of the pulses $r1$ and $r2$, respectively, emanating from a preceding limit edge. If this is not so, the comparator C1 and the register ME perform the task of signalling an error.

In the course of a reading operation for checking the writing, the second comparator C2 (FIGURE 3) cooperates with the test registers M1, M2 and M3. These devices utilise the two versions Z1 and Z0 of the input signal and the first-rhythm, second-rhythm and third-rhythm pulses $r1$, $r2$ and $r3$. Certain details of their operation may be explained with reference to FIGURE 6. The corresponding graphs have been limited to the period $t3$–$t6$, corresponding to the same period of FIGURE 5, during which a defective read signal is encountered.

The signals Z1 and Z0 are of course identical to those of FIGURE 5. As already stated, the rhythm pulses $r1$ and $r2$ are now advanced by 0.1 T$m$. For example, pulses $r1$ exist whose leading edge is positioned 0.65 T$m$ after each of the instants $t3$, $t43$ and $t44$. Each pulse $r2$ has its leading edge positioned 0.5 T$m$ after the leading edge of the preceding pulse $r1$. The operation of the registers M1 and M2 is not changed, except that their change-overs are also advanced in time. On the other hand, there exists a pair of pulses $r3$, which are triggered by a corresponding pair of pulses $r1$ and $r2$, and whose leading edges are located 0.7 T$m$ and 1.2 T$m$ respectively after a limit edge of the signals Z1 and Z0, taken as reference.

It is the pulses $r3$ which produce the changes of state of the register M3. It is to be noted that, since the latter has no output inverting amplifier, the signals Z1 and Z0 applied to the inputs of the AND circuits are transposed in relation to the registers M1 and M2. The line $m3$ in FIGURE 6 shows how the changes of state of the register M3 succeed one another through voltage levels available at its output $m3$.

In the comparator C2, the AND circuits 76 to 79 constantly perform the comparison of the states of the registers M1 and M3 on the one hand and M2 and M3 on the other hand. A first sampling, utilising the AND circuits 76 and 77, ensures that at the instant of each pulse $r2$ the states of the registers M1 and M3 are identical. The second sampling, utilising the AND circuits 78 and 79, ensures that at the instant of each pulse $r1$ the states of the registers M2 and M3 are also identical. As long as the input signal is correct, the AND circuits 76 to 79 remain non-conductive and the negative voltage level at the output $c2$, corresponding to the state "0" of the trigger circuit 81, is interpreted as a "non-error" signal.

To sum up the check made by the comparator C2, it may be stated that it ensures that there is no edge of Z1 or Z0 during each of the pulses $r3$. This check is only "marginal," but it must be regarded as sufficient because, during this mode of operation, the greatest reliance is placed upon the parity-checking circuits usually employed to detect errors resulting from defective writing. However, it may happen that, although no error is detected by the parity check, some read signals are slightly defective without being completely wrong, and this may result in errors during the normal reproduction under slightly different conditions. It is therefore the function of the comparator C2 to indicate these doubtful signals in order to stop the magnetic tape, to rewind it and to rewrite the same block of information.

In FIGURE 6, the crossing point 84 and the excessively advanced limit edge resulting therefrom in Z1 and Z2 constitute a characteristic defect, since it will be seen that the pulse $r3$, 88 straddles the instant $t44$ of the said limit edge. Now, the register M3, which was previously in the state "1," changes to the state "0" at the leading edge of the pulse 88. However, after the instant $t44$, the register M3 returns to the state "1," because it is now Z0 which is negative. At the instant $t52$, at the time of the succeeding pulse $r2$, it may be seen that the registers M1 and M3 are in different states. Therefore, at this instant, the AND circuit 76 of the comparator C2 is conductive and the pulse $r2$ changes the state of the trigger 81, the output of which immediately produces the "error" signal.

In the second mode of operation, the condition concerning the change-overs of the registers M1 and M2, which is valid during normal reading, is no longer sufficient. No limit or digital edge must occur during a third-rhythm pulse $r3$, in order that the input signal may be recognised as correct. Otherwise, a change of state of the register M3 occurs during a pulse $r3$, and this is thereafter indicated as an error by the second comparator C2.

While it has been seen that during the normal reading the position changes of the limit and digital edges are limited to + or −25% of the mean duration T$m$ of the bit periods, it may be observed that during the writing-check reading the check which is made is a little stricter, since in the latter case, the said position changes are limited to + or −20% of the duration T*m*.

It will readily be appreciated that the exploitation system which has been described could process an input signal in which the limit edges succeed one another at a well-determined stable mean frequency, while admitting of momentary changes which compensate for one another sufficiently quickly. In this case, it is clear that the monitoring device 18 could be omitted, it being a simple matter to provide the necessary modifications and adjustable replacement members.

Further modifications of a technological nature remain within the scope of the person skilled in the art.

I claim:

1. A circuit arrangement for exploiting a sequence of read signals derived from a magnetic recording, these signals oscillating from one to the other of two voltage levels, at all transitions indicative of bit cell limits and at middle-cell transitions which represent each a particular binary digit of the recorded data, the arrangement comprising: pulse generator means operatively connected for generating from each of said "limit" transitions, one first rhythm pulse and one second rhythm pulse respectively 0.75T and 1.25T after each "limit" transition, T being the nominal duration of a bit period; a first dual-state test register whose input terminals are logically controlled so that its state changes upon receipt of a first rhythm pulse if said read signal is at a first level; a second dual-state test register whose input terminals are logically controlled so that its state changes upon receipt of a second rhythm pulse if said read signal is at its second level, a comparator device logically connected and having two outputs to compare the states of said first and second test registers; and a digit store associated with two AND-circuits whose separate inputs are connected to the outputs of said comparator device and a common input of which receives said second rhythm pulses, whereby the output of this store supplies subsequent to each bit period a signal of a first value when the data detected is a one, or a signal of a different second value when the data detected is a zero.

2. A circuit arrangement according to claim 1, further comprising an "error" store controlled by an AND-circuit of which an input receives said first rhythm pulses and another input is connected to an output of said comparator device so that no error signal is delivered as long as there is only one "limit" transition in the read signals between any first rhythm pulse and the following second rhythm pulse.

3. A circuit arrangement according to claim 2, wherein said generator means includes a time measuring device synchronized by said "limit" transitions of the read signals, a first pulse generator connected to said measuring device for generating a first rhythm pulse at a time 0.75T after each such "limit" transition, an intermediary generator connected to receive said first rhythm pulses, and a second pulse generator connected to said intermediary generator for generating a second rhythm pulse at a time 0.5T after each said first rhythm pulse.

4. A circuit arrangement for exploiting a sequence of read signals derived from a magnetic recording, these signals oscillating from one to the other of two voltage levels, at all transitions indicative of bit cell limits and at middle-cell transitions which represent each a particular binary digit of the data being read, the bit period of these "limit" transitions being liable to vary relatively slowly around a nominal duration T, the arrangement comprising: pulse generator means having automatic timing correcting means and being operatively connected for generating from each of said "limit" transitions, one first rhythm pulse and one second rhythm pulse respectively 0.75T*m* and 1.25T*m* after each such "limit" transition, T*m* being the mean duration of some preceding bit periods; a first dual-state test register whose input terminals are logically controlled so that its state changes upon receipt of a first rhythm pulse if said read signal is at a first level; a second dual-state test register whose input terminals are logically controlled so that its state changes upon receipt of a second rhythm pulse if said read signal is at its second level, a comparator device logically connected and having two outputs to compare the states of said first and second test registers, and a digit store associated with two AND-circuits whose separate inputs are connected to the outputs of said comparator device and a common input of which receives said second rhythm pulses, whereby the output of this store supplies at each bit period a signal of a first value when the data detected is a one, or a signal of a different second value when the data detected is a zero.

5. A circuit arrangement according to claim 4, further comprising an "error" store controlled by an AND-circuit, of which an input receives said first rhythm pulses and another input is connected to an output of said comparator device so that no error signal is delivered as long as there is only one "limit" transition in the read signals between any first rhythm pulse and the following second rhythm pulse.

6. A circuit arrangement according to claim 5, wherein said pulse generator means comprises: a time base circuit and a time measuring device synchronized by said "limit" transitions of the read signals; a first pulse generator connected to said measuring device for generating a first rhythm pulse at a time 0.75T*m* after each such "limit" transition, an intermediary generator connected to receive said first rhythm pulses, and a second pulse generator connected to said intermediary generator for generating a second rhythm pulse at a time 0.5T*m* after each said first rhythm pulse.

7. A circuit arrangement according to claim 6, wherein said automatic timing correcting means, being connected to said time base circuit through an integrator circuit, are coupled to control the operative conditions of said time measuring device and of said intermediary generator.

8. A circuit arrangement for exploiting a sequence of read signals derived from a magnetic recording, these signals oscillating from one to the other of two voltage levels, at all transitions indicative of bit cell limits and at middle-cell transitions which represent each a particular binary digit of the recorded data, the arrangement comprising pulse generator means operatively connected for generating from each of said "limit" transitions, one first rhythm pulse and one second rhythm pulse respectively 0.65T and 1.15T after each of said "limit" transitions, T being the nominal duration of a bit period, and for generating one third rhythm pulse of predetermined width after each of said first and second rhythm pulses, a first dual-state test register whose input terminals are logically controlled so that its state changes upon receipt of a first rhythm pulse if said read signal is at a first level, a second dual-state test register whose input terminals are logically controlled so that its state changes upon receipt of a second rhythm pulse if said read signal is at its second level, a third dual state test register whose input terminals are logically controlled to receive said read signals and said third rhythm pulses, and a comparator device having a bistable circuit and with input terminals logically controlled to sample, on the one hand the states of said first and third test registers with said second rhythm pulses, and on the other hand the states of said second and third test registers with said first rhythm pulses, whereby said bistable circuit can deliver an error signal when any transition in said read signals occurs during one of said third rhythm pulses.

9. A circuit arrangement according to claim 8, wherein said generator means includes: a time measuring device synchronized by said limit transitions of the read signals, a first pulse generator connected to said measuring device for generating a first rhythm pulse at a time 0.65T after each such "limit" transition, an intermediary generator connected to receive said first rhythm pulses, a second pulse generator connected to said intermediary generator for generating a second rhythm pulse at a time 0.5T after each said first rhythm pulse, and a third pulse generator connected to generate a third rhythm pulse after each of said first and second rhythm pulses.

10. A circuit arrangement for exploiting a sequence of read signals derived from a magnetic recording, these signals oscillating from one to the other of two voltage levels, at all transitions indicative of bit cell limits and at middle-cell transitions which represent each a particular binary digit of the data being read, the bit period of these "limit" transitions being liable to vary relatively slowly around a nominal duration T, the arrangement comprising: pulse generator means having automatic timing correcting means and being operatively connected for generating from each of said "limit" transitions, one first rhythm pulse and one second rhythm pulse respectively 0.65T*m* and 1.15T*m* after each such "limit" transition, T*m* being the mean duration of several preceding bit periods, and for generating one third rhythm pulse of determined width after each of said first and second rhythm pulses; a first dual-state test register whose input terminals are logically controlled so that its state changes upon receipt of a first rhythm pulse if said read signal is at a first level, a second dual-state test register whose input terminals are logically controlled so that its state changes upon receipt of a second rhythm pulse if said read signal is at its second level, a third dual-state test register whose input terminals are logically controlled to receive said read signals and said third rhythm pulses, and a comparator device having a bistable circuit and with input terminals logically controlled to sample, on the one hand the states of said first and third test registers with said second rhythm pulses, and on the other hand the states of said second and third test registers with said first rhythm pulses, whereby said bistable circuit can deliver an error signal when any transition in said read signals occurs during one of said third rhythm pulses.

11. A circuit arrangement according to claim 10, wherein said pulse generator means comprises: a time base circuit and a time measuring device synchronized by said "limit" transitions of the read signals; a first pulse generator connected to said measuring device for generating a first rhythm pulse at a time 0.65T*m* after each such "limit" transition, an intermediary generator connected to receive said first rhythm pulses, a second pulse generator connected to said intermediary generator for generating a second rhythm pulse at a time 0.5T*m* after each said first rhythm pulse, and a third pulse generator connected to generate a third rhythm pulse after each of said first and second rhythm pulses.

12. A circuit arrangement according to claim 11, wherein said automatic timing correcting means, being connected to said time base circuit through an integrator circuit, are coupled to control the operative conditions of said time measuring device, of said intermediary generator and of said third pulse generator.

References Cited

UNITED STATES PATENTS

| | | | |
|---|---|---|---|
| 2,979,565 | 4/1961 | Zarcone | 178—50 |
| 3,226,685 | 12/1965 | Potter et al. | 340—172.5 |

PAUL J. HENON, *Primary Examiner.*

R. RICKERT, *Assistant Examiner.*